(12) United States Patent
Steijer et al.

(10) Patent No.: US 6,173,098 B1
(45) Date of Patent: Jan. 9, 2001

(54) OPTO-MECHANICAL DEVICE

(75) Inventors: Odd Steijer, Bromma; Christer Moll, Enskede; Bengt Lindström, Älta; Christian Vieider, Sollentuna; Paul Eriksen, Tyresö; Jan-Åke Engstrand, Trångsund; Olle Larsson, Stockholm; Håkan Elderstig, Bromma, all of (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 08/848,618

(22) Filed: Apr. 29, 1997

(30) Foreign Application Priority Data

May 3, 1996 (SE) .................................................... 9601703

(51) Int. Cl.⁷ ...................................................... G02B 6/38
(52) U.S. Cl. ............................................... 385/65; 385/83
(58) Field of Search ................................. 385/65, 59, 83, 385/89

(56) References Cited

U.S. PATENT DOCUMENTS

| | | | |
|---|---|---|---|
| 4,950,048 | * | 8/1990 | Kakii et al. ...................... 350/96.2 |
| 5,351,328 | * | 9/1994 | Kakii et al. ...................... 385/83 |
| 5,441,397 | | 8/1995 | Eriksen et al. . |
| 5,664,039 | * | 9/1997 | Crinderslev et al. ................ 385/65 |
| 5,764,833 | * | 6/1998 | Kakii et al. ...................... 385/65 |

FOREIGN PATENT DOCUMENTS

| | | |
|---|---|---|
| 0642043A1 | 3/1995 | (EP) . |
| 2 256 286 | 12/1992 | (GB) . |
| 62-276513 | 12/1987 | (JP) . |
| WO96/13068 | 5/1996 | (WO) . |

OTHER PUBLICATIONS

International–Type Search Report –National Application No. 9601703–3 Search Request No. SE 96/00513 –Mar. 5, 1997.
Patent Abstracts of Japan, vol. 12, No. 163, P–703, abstract of JP, A , 62–276513 (Sumitomo Electric Ind Ltd), Dec. 1, 1987.

* cited by examiner

*Primary Examiner*—Hung N. Ngo
(74) *Attorney, Agent, or Firm*—Burns, Doane, Swecker & Mathis, L.L.P.

(57) ABSTRACT

The present invention relates to a manufacturing method for an opto-mechanical connector (10) and to the connector itself. The invention includes that a fixture (1) is manufactured with straight and parallel grooves (2,3) running on the upper side of the fixture (1) from a first fixture side (1*a*) to a second fixture side (1*b*), and which grooves (2,3) are intended partly for optical fibers and partly for guide pins. A lid (4) is attached above the fixture (1), whereafter optical fibers (8) from, for example, a fiber ribbon cable (6) are introduced into the grooves (2) intended for the fibers from the first fixture side (1*a*) so that the fiber ends (8) extend out through the second fixture side (1*b*). Guide pins (9) are furthermore introduced into the grooves (3) intended for the guide pins. The structure obtained (fixture (1), lid (4), fiber ends (8) and guide pins (9)) is completely or partially enclosed by a plastic capsule (11).

12 Claims, 3 Drawing Sheets

OPTO-MECHANICAL DEVICE

TECHNICAL FIELD

The present invention relates to a production process for an opto-mechanical connector and to the connector itself.

STATE OF THE ART

In order to reduce the total cost for connecting optical fibers, multifibre connectors are used. The advantage of these is that the time-consuming and therewith costly mounting and supplementary work stages can be performed on several fibers at once.

One of the best known embodiments of multifibre connectors is the Japanese so-called MT-connector. This is based upon a precision part made of extruded thermosetting plastic in which the fibers are mounted (glued).

In another embodiment of multifibre connectors, an MT-compatible optical connector is extruded directly onto the fibers, see Swedish Patent Application No. 9301858-8. The fibers as well as guide pins are placed and fixed in V-shaped grooves in the cavity of the mould, after which the extrusion takes place. This method means that the gluing operation disappears, which rationalises the production and is expected to lower the cost for it.

In order to bring about the low damping which is aimed for, for example in a fiber connection, extremely dimension and fitting tight tolerances (better than 1 μm) are required. This is naturally associated with great difficulties and costs when using traditional machining methods such as milling and sparking in order to achieve the required precision in the mould. But even when this has been achieved there still remain problems. The fibers can be positioned incorrectly in the grooves if the grooves or the fibers are contaminated with e.g. left-overs from the casting. This can occur when the thermoplastic contains a large quantity of filler (approx. 70% by weight) consisting of quartz grains (with a diameter up to 50 μm), which can get into the V-grooves. Careful cleaning of the moulds and inspection after each extrusion cycle are therefore necessary, which leads to higher manufacturing costs.

A solution is to use small precision parts, so-called fixtures, as micro-mechanical supporting elements. The precision parts can be manufactured in e.g. silicon, whereby several of these can be obtained from a silicon disc, which can give a low manufacturing cost. The precision parts position fibers and guide pins in relation to each other and are moulded into the connector. This means that the precision requirement on the moulding cavity is reduced considerably.

European Patent Application No. 0 642 043 A1 shows an optical connector which comprises a precision part with a lid, which is moulded into the connector. The precision part has V-grooves for fibers and guide pins. The connector has an opening so that parts of the V-grooves for the fibers are exposed. The fibers can be watched through this opening when they are introduced into the connector and fixed when they are positioned in a predetermined place.

DISCLOSURE OF THE INVENTION

The object of the present invention is to obtain an optical connector, especially for fiber ribbons, which can be quickly and easily connected and which gives a very low damping. The connector shall have high mechanical precision and furthermore be simple and cheap to manufacture.

This is achieved by using a precision part as a micro-mechanical supporting element. The precision part is manufactured with grooves for fibers and guide pins. A lid is fastened on the precision part and the fibers and guide pins are positioned in the respective grooves, after which the encapsulating takes place.

The precision part or fixture is manufactured with straight and parallel grooves running on the upper side of the fixture from a first fixture side to a second fixture side, and which grooves are partially intended for optical fibers and partially for guide pins. A lid is fastened above the fixture, for example by anodic bonding. Fiber ends from, for example, a fiber ribbon cable are introduced into the grooves intended for the fibers from the first fixture side so that the fibre ends extend out through the second fixture side. Guide pins are introduced into the grooves intended for the guide pins. They can stick out through both the first and the second fixture side.

The structure obtained (fixture, lid, fibre ends and guide pins) is positioned in a mould cavity, whereafter the structure is completely or partially surrounded by a capsule, especially one made of plastic. The fibre ends can then be polished.

If the mould cavity is equipped with means so that the second side of the fixture is surrounded by plastic, any necessary polishing is made simpler because it is easier to polish a combination of fibers and plastic than fibers and fixture material. The means can also be so shaped (for example with bevellings) that the impressions from it form marks which make it possible during polishing to match the distance to the second side of the fixture.

An advantage of the present invention is that the precision requirements on the mould cavity are reduced considerably when micro-mechanical supporting elements are used.

Furthermore, the risk of contamination in the grooves is eliminated. This gives a more rational manufacturing.

Another advantage is that, if the connector is extruded or pressed directly onto the fibers and fixtures, the fibre does not need to be glued which simplifies and reduces the cost of the manufacturing.

Yet another advantage of the invention is that the moulded-in fixture functions as an anchor in the plastic and facilitates the fastening of the fibers.

Furthermore, any necessary polishing will be more simple if the second side of the fixture is surrounded by plastic, and consequently only a combination of fibers and plastic need to be polished. By using means which give an impression with markings, the distance to the second side of the fixture can be matched during polishing.

DESCRIPTION OF THE DRAWINGS

The invention is described more closely below with reference to the appended drawings.

PREFERRED EMBODIMENTS

Figure 1:
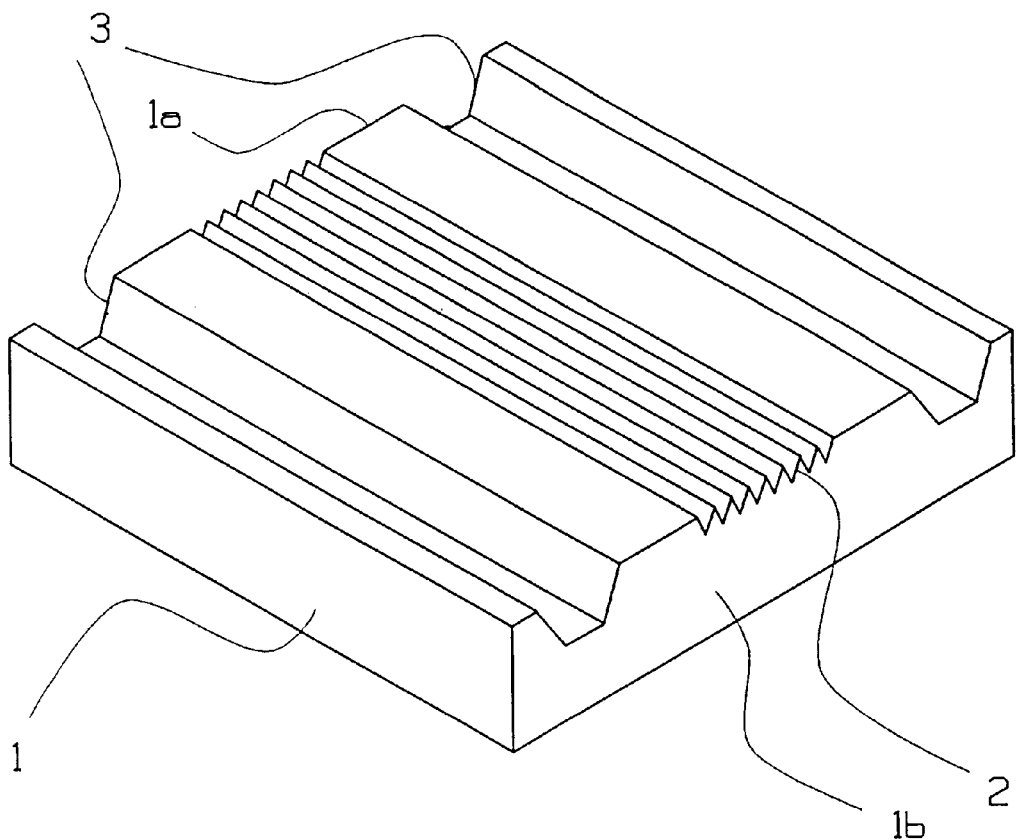
FIGS. 1 and 2 illustrate a high-precision part according to a preferred embodiment of the invention.
Figure 2:
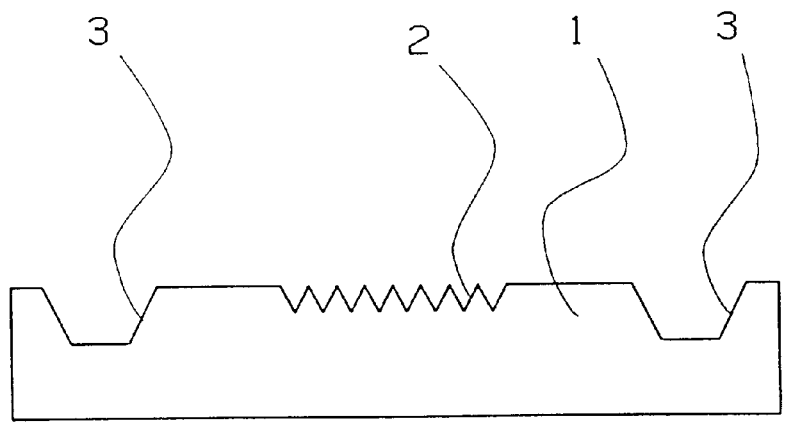

In FIGS. 1 and 2, a high-precision detail or fixture 1 made preferably of silicon is shown in perspective and from one side. The fixture 1 has grooves 2 for optical fibers from e.g. a fibre ribbon cable. In FIGS. 1 and 2 the number of grooves 2 is eight, but can be any arbitrary number. The fixture 1 also has grooves 3 for the guide pins (which are used for the external connection). The grooves 2, 3 can have any arbitrary cross-sectional shape but preferably have a V-shape. The grooves 3 can advantageously have flat bottoms. In the following they will also be referred to as V-grooves. All the V-grooves are straight and parallel and run on the upper side of the fixture from a first fixture side 1a to a second fixture side 1b.

Preferably, several fixtures 1 are manufactured at the same time on a silicon disc. All the V-grooves 2, 3 are defined by one and the same mask, whereafter wet etching takes place. The precision between the V-grooves 2, 3 is ensured this way.

Figure 3:
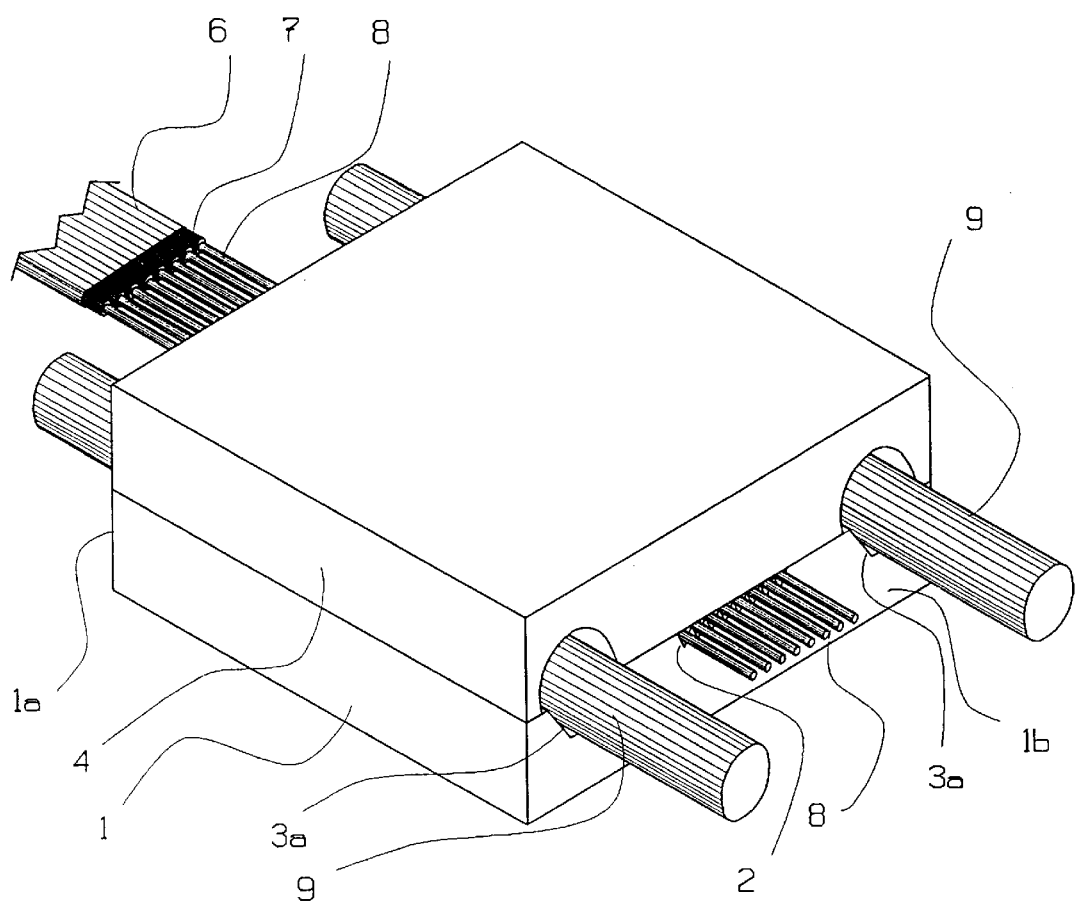
FIGS. 3 and 4 illustrate a high-precision part with lid and fibers resp guide pins positioned according to a preferred embodiment of the invention.
Figure 4:
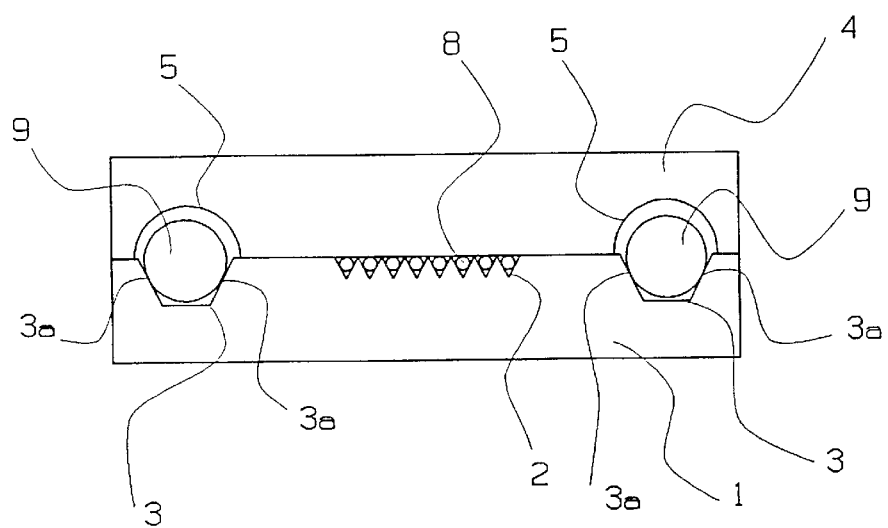

According to the invention, an upper part or a lid 4, consisting of glass, silicon or other material, is fastened onto the fixture 1. In FIGS. 3 and 4 the lid 4 can be seen mounted. Together with the lid 4 the V-grooves 22 for the fibers form triangular capillaries with an accurate fit to the outer dimensions of the fibers. The lid can have a recess 5 above the V-grooves 3 of the guide pins which permits a loose fit with the outer dimensions of the guide pins. The lid 4 can be joined to the fixture 1 by bonding techniques, e.g. anodic bonding. Which bonding technique is most suitable depends on the choice of material in the lid 4. The bonding can advantageously be performed parallel on the silicon disc. The separate details can then be sawn out.

According to the invention, optical fibers 8 are introduced into the triangular capillaries, (i.e. into the grooves 2 intended for the fibers) from the first fixture side 1a so that the fibre ends 8 project out through the second fixture side 1b. The optical fibers 8 can, for example, originate from a multifibre cable 6, which has its protective casing and the protective casing 7 of the individual fibers removed from one end. The lid 4 and/or the fixture 1 can be bevelled on the side where the fibers 8 are introduced so that the triangular capillaries obtain funnel-like openings (not shown in the drawings). This facilitates the introduction of the fibers 8 considerably.

The fibre ends 8 can be fixed in any suitable manner, e.g. by gluing into the V-grooves 2, but this is not necessary. They can also be fixed into a mould cavity during, for example, the shaping of a capsule 11. The guide pins 9, called mould cavity guide pins, are introduced into the grooves 3 intended for the guide pins.

The positioning in the mould cavity can, for example, take place in the same way as stated in the Swedish Patent Application 9403573-0, i.e. by influencing the fixture 1 from below with an upwardly directed force (e.g. a spring force) so that by means of suitably shaped opposing surfaces (from above) the mould cavity guide pins 9 are brought to rest against the side walls 3a of the V-grooves. The grooves should be so constructed that the centre lines for the fibers 8 fixed in the triangular capillaries lie in the same plane as the centre lines of the guide pins 9.

Figure 5:
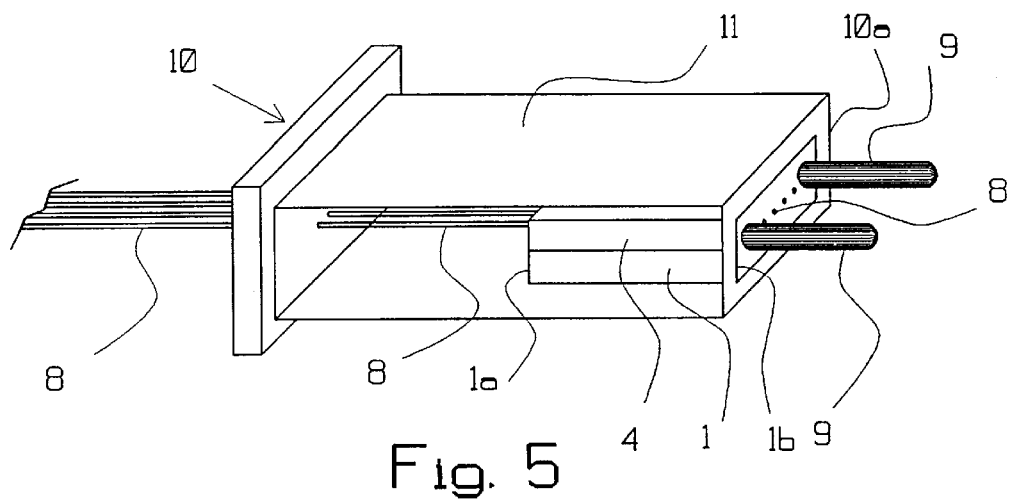
FIGS. 5–7 illustrate an opto-mechanical connector according to a preferred embodiment of the invention.
Figure 6:
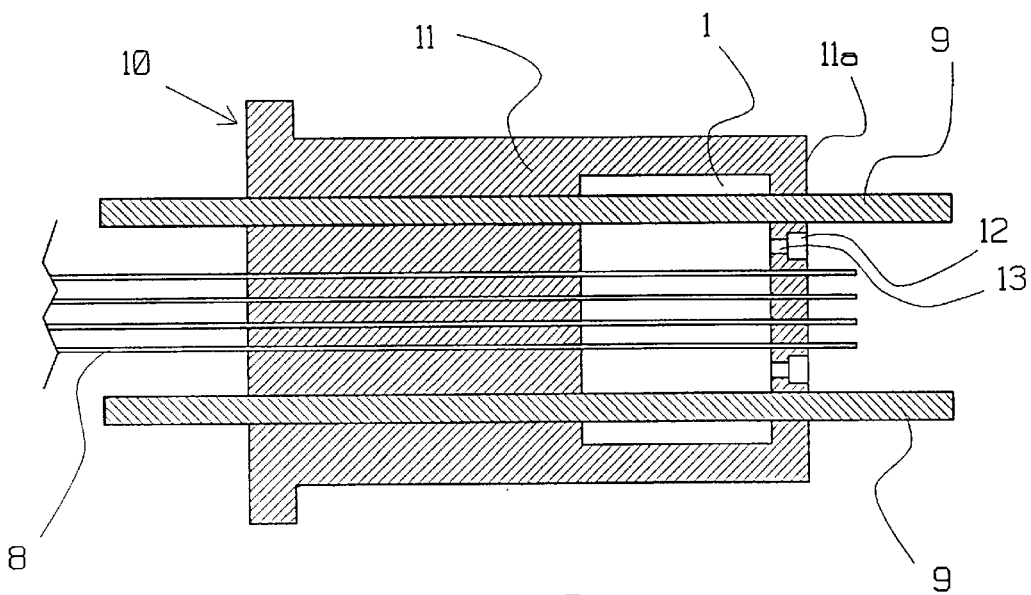

The production of the surrounding capsule 11 (see FIG. 5) then takes place so that an optical and mechanical interface is formed. Preferably extrusion pressing (transfer moulding) or injection moulding of plastic directly onto the fibers 8 and the fixture 1 is used, and consequently the fibers 8 do not need to be glued, which simplifies the manufacturing and makes it cheaper. In FIG. 5 the finished connector 10 is shown schematically in perspective. One side of the connector has been made transparent here for the sake of illustration. FIG. 6 shows a cross-section of the connector and in FIG. 7 the connector is seen from in front. The finished connector advantageously has guide pins 9 which are not identical to the guide pins used in the mould cavity. The guide pins can be of different length (cf. FIG. 3, FIG. 5 and FIG. 6). Preferably, the connector follows the so-called MT-connector standard.

Figure 7:
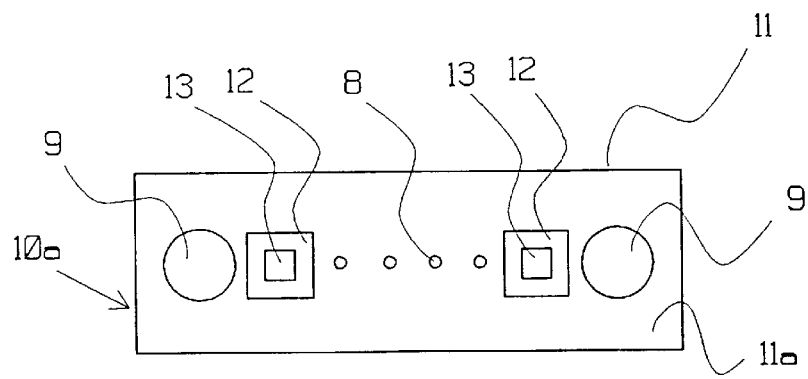

Preferably, the fibre ends 8 are polished after the production of the plastic capsule. The polishing can cause problems because a number of different materials are present in the front 10a of the connector. By shaping the mould cavity with opposing means for the fixture 1 and using the stiffness of the fibers, a precision part can be formed where only the fibre ends 8 extend out of the front 11a of the plastic capsule, as shown in FIG. 7. According to the invention, polishing only of the front 11a of the plastic capsule and the fibers 8 then takes place, just as for an ordinary MT-connector.

Alternatively, the mould cavity can be shaped in such a way that a tongue of plastic (not shown) is formed which surrounds the fibre ends 8 projecting out of the front 11a of the plastic capsule. In particular, this tongue has a waist (not shown) near the front 11a of the plastic capsule so that the tongue can easily be broken off (at the waist) after the plastic capsule moulding. The fracture surface of the front can then be polished.

If the opposing surface in the mould cavity is manufactured in a suitable way (e.g. bevelled), the impressions 12,13 from the opposing surface can also be used as markers in order to determine how much plastic remains between the front surface 11a of the plastic capsule and the enclosed fixture 1, so that the polishing can be stopped at a predetermined distance.

By using micro-mechanical supporting elements 1 as in the present invention, the precision requirements on the mould cavity is reduced considerably. The risk of contamination of the grooves 2, 3 is reduced considerably in relation to if the grooves were to lie in the tool itself. This gives a more rational manufacturing. Furthermore, the cast-in fixture 1 functions as an anchor in the plastic and simplifies the fastening of the fibers.

By injection moulding or extrusion moulding the fibers 8 onto the micro-mechanical supporting element 1, the conventional gluing step disappears, which gives a simpler and cheaper manufacturing.

The polishing becomes simpler if the second side 1b of the fixture is surrounded by plastic, and consequently only a combination of fibre and plastic needs to be polished. By using opposing surfaces which give impressions 12,13 with markings, the distance to the second side of the fixture can be matched during the polishing.

What is claimed is:

1. Process for the production of an opto-mechanical connector, comprising the steps of:

manufacturing a fixture with straight and parallel optical fiber grooves and guide pin grooves running on an upper side of the fixture from a first fixture side to a second fixture side the optical fiber grooves being adapted to receive optical fibers from a fiber ribbon cable and the guide pin grooves being adapted to receive guide pins, fastening a lid onto the fixture, introducing optical fibers into the optical fiber grooves from the first fixture side so that ends of the optical fibers extend out through the second fixture side, introducing guide pins into the guide pin grooves, positioning a structure including the fixture, the lid, optical fibers, and guide pins in a mold cavity, at least partially enclosing the structure by a plastic capsule by molding, the molding including providing opposing surfaces in a mold cavity for positioning of the structure so that when the structure is at least partially enclosed by a capsule, at least a side of the structure comprising the second fixture side is enclosed by plastic.

2. Method according to claim 1, further comprising enclosing the structure by a plastic capsule by injection molding or transfer molding.

3. Method according to claim 1, further comprising polishing the ends of the optical fibers extending out of the second fixture side.

4. Method according to claim 1, further comprising providing recesses in the lid above the guide pin grooves so that a loose fitting to the outer dimensions of the guide pins is achieved.

5. Method according to claim 1, further comprising fastening the lid onto the fixture by bonding.

6. Method according to claim 1, further comprising forming the opposing surfaces such that impressions from the opposing surfaces define markers for determining a distance between a surface of the capsule and the second fixture side.

7. Method according to claim 1, further comprising enclosing the optical fiber ends extending out from the second fixture side by a plastic tongue with a waist and breaking the plastic tongue off at the waist after forming of the connector.

8. Method according to claim 1, further comprising providing, with the mold cavity, an upwardly directed force so that the guide pins are caused to contact side walls of the grooves.

9. Opto-mechanical connector, comprising:

a fixture with straight and parallel optical fiber grooves and guide pin grooves running on an upper side of the fixture from a first fixture side to a second fixture side, a lid attached above the fixture, optical fibers disposed in capillaries defined by the guide pin grooves and the lid such that ends of the optical fibers extend out through both the first side and the second side of the fixture, and a molded plastic capsule formed around a structure comprising the fixture, the lid and the optical fibers such that it completely surrounds the fixture and the lid.

10. Opto-mechanical connector according to claim 9, wherein the ends of the optical fibers extending out of the second side of the fixture are level with the front of the capsule.

11. Opto-mechanical connector according to claim 10, wherein the ends of the optical fibers are polished.

12. Opto-mechanical connector according to claim 9, further comprising guide pins disposed in the guide pin grooves.

* * * * *